(12) United States Patent  
Berlin et al.

(10) Patent No.: US 7,480,394 B2  
(45) Date of Patent: Jan. 20, 2009

(54) METHOD AND ARRANGEMENT FOR RECOGNIZING OBJECTS IN MAIL ITEM IMAGES, THEIR POSITION AND READING THEIR POSTAL INFORMATION

(75) Inventors: Bernhard Berlin, Berlin (DE); Svetlozar Delianski, Berlin (DE); Georg Kinnemann, Bestensee (DE)

(73) Assignee: Siemens Aktiengesellschaft, Munich (DE)

( * ) Notice: Subject to any disclaimer, the term of this patent is extended or adjusted under 35 U.S.C. 154(b) by 406 days.

(21) Appl. No.: 11/113,315

(22) Filed: Apr. 25, 2005

(65) Prior Publication Data

US 2008/0137907 A1 Jun. 12, 2008

(30) Foreign Application Priority Data

Apr. 14, 2005 (DE) .................. 10 2005 017 228

(51) Int. Cl.
*G06K 9/00* (2006.01)
*B65G 11/04* (2006.01)
*B65D 27/06* (2006.01)

(52) U.S. Cl. ..................... 382/101; 193/8; 229/300

(58) Field of Classification Search ............... 382/100, 382/101, 181; 193/8; 229/92, 300, 301, 229/302, 305, 306, 921; 705/60, 401

See application file for complete search history.

(56) References Cited

U.S. PATENT DOCUMENTS 5,563,955 A * 10/1996 Bass et al. ................. 382/101
6,587,572 B1 * 7/2003 Suchenwirth-Bauersachs et al. ......................... 382/101

* cited by examiner

*Primary Examiner*—Abolfazl Tabatabai  
(74) *Attorney, Agent, or Firm*—Laurence A. Greenberg; Werner H. Stemer; Ralph E. Locher

(57) ABSTRACT

The invention relates to a method for recognizing objects in mail items and an arrangement for carrying out the method. In the method, the color image produced in the relevant color camera is converted into a gray level image having a resolution higher than that of the color camera and suitable for reading the postal information in the automatic reading devices; the color image produced in the relevant color camera is converted into a color image having a resolution lower than the camera resolution but sufficient far recognizing objects and their positions; the objects and their position present in the relevant lower resolution color image are determined and identified, the assignment of the objects to postal information categories being performed on the basis of structural rules established in an upstream teaching phase, and the required postal information in the gray level images of the relevant identified objects are automatically read.

11 Claims, 4 Drawing Sheets

METHOD AND ARRANGEMENT FOR RECOGNIZING OBJECTS IN MAIL ITEM IMAGES, THEIR POSITION AND READING THEIR POSTAL INFORMATION

BACKGROUND OF THE INVENTION

The invention relates to a method and an arrangement for recognizing objects in mail item images, their position and reading their postal information in color and gray level images of mail item surfaces using at least one automatic reading device.

For large letters, magazines and packets it is often difficult to find and read the postal inscriptions such as the addressee's name and address as well as sender's particulars. The cause often lies with colored, patterned background images which may even contain other texts. To solve this problem, the practice has been to capture the mail item surfaces using a low resolution color camera and a high resolution gray level camera only the areas containing the postal information would be looked for and identified in the coarse color image of the mail item surface. Using this information, the corresponding inscriptions could then be read in the high resolution gray level image (U.S. Pat. No. 6,798,896 B2, DE 195 32 842 C1). Having two cameras has meant that complex/costly synchronization is also necessary.

SUMMARY OF THE INVENTION

The object of the invention is to create a method and an arrangement for recognizing objects in mail item images, their position and reading their postal information, that require less complexity compared to the prior art.

This object is achieved according to the invention by the features set forth in claims 1 and 8.

This involves the following operations:

Capturing the mail item surface using at least one color camera,

Converting the color image produced in the relevant color camera into a gray level image having a resolution higher than that of the color camera and suitable for reading the postal information in the automatic reading devices, Converting the color image produced in the relevant color camera into a color image having a resolution lower than the camera resolution but sufficient for recognizing objects and their positions, Determining and identifying the objects in the relevant lower resolution color image including their position, the assignment of the objects to postal information categories being performed on the basis of structural rules established in an upstream teaching phase, Automatic reading of the required postal information in the gray level images of the relevant identified objects.

Only one camera is therefore required, which also eliminates any alignment and synchronization problems.

Advantageous embodiments of the invention are set forth in the sub-claims.

In order to enable the postal information to be read more effectively and quickly, it is advantageous if the automatic reading devices include a plurality of specialized OCR units which are assigned to defined objects and if the postal information of the identified, defined objects in the associated gray level images is read by the assigned OCR units.

Thus it is advantageous if the gray level images of the entire mail item surface are transmitted with the object data to the OCR units and only read in the gray level images of the relevant objects. The areas to be read are therefore cut out of the overall image in each OCR unit.

An equivalent possibility consists in transferring the object data, together with the gray level images of said objects only, to the OCR units.

It is also advantageous if the image data of the gray level image and low resolution color image of each mail item surface is transferred synchronously to the automatic reading device.

For the position of the objects it is also particularly advantageous to determine their orientation and to use the position and orientation data to control an alignment device which brings the mail items into a uniform position.

An advantageous instrumental embodiment is obtained if the first three operations are carried out in the processor of the color camera.

A cost-saving embodiment can be achieved if the color camera has an RGB CCD line sensor past which the mail items are transported.

BRIEF DESCRIPTION OF THE SEVERAL VIEWS OF THE DRAWINGS

The invention will now be explained in an exemplary embodiment with reference to the associated drawings in which:

FIG. 3 schematically illustrates the transmission of the camera signals to the frame grabber of an evaluating computer unit.

DETAILED DESCRIPTION OF THE INVENTION

A color scanner 12 with a color camera 11 is provided for each surface of mail items to be sorted. A color image processing system evaluates the generated images of each item and issues appropriate commands for aligning and sorting the mail items to a sorting system.

Figure 1:
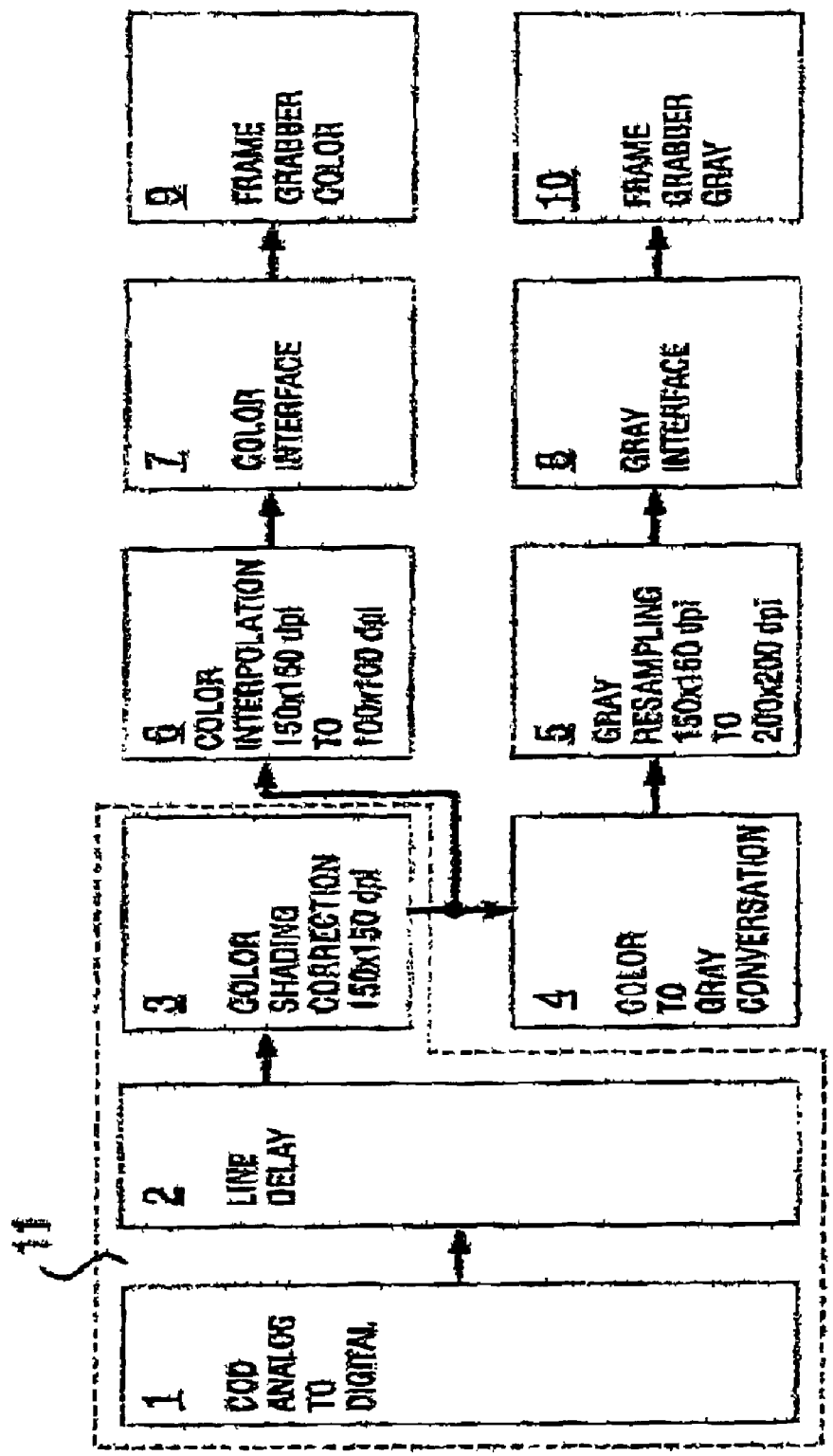
FIG. 1 shows functional blocks of a color camera used.

FIG. 1 shows a functional block diagram of a color line camera 11 with additional functions for generating the higher resolution gray level image and lower resolution color image. When using trilinear CCD lines 1, three color lines for the colors red, green and blue are spaced 4 to 8 image lines apart. By means of appropriate delay introduced in the delay arrangement 2, the digital signals present are delayed such that the 3 color pixels come from the same image point. The subsequent processing of the color information of the color sensor requires another correction, known as white balancing, of each pixel using three multipliers. This is determined for the 3 colors using a white test pattern. The homogeneous white pattern is moved past the camera(s)/scanner(s) by the sorting system. The values determined are then used for correction in a correction functional block 3.

The color sensor 1, 2 inside the color camera 11 supplies a color image in RGB format. This means that for each pixel the red, green and blue portion is captured and is represented by the value triple (R,G,B).

From this color image a gray level image is calculated by means of a conversion rule in a functional block 4 by representing each pixel by an individual value Y. This value generally represents the brightness of the pixel.

The gray image Y resulting from the pixel of the color image R, G. B is given by:

$$Y = r*R + g*G + b*B$$

The coefficients r, g, and b can be set in the range 0 to 100%.

For using the gray level images in OCR reading devices, a resolution of 200 dpi is required. The camera image with a resolution of 150 dpi must therefore be interpolated. Inside the color scanner 12, a bilinear interpolation is implemented for this purpose in a functional block 5.

A bilinear interpolation is a method of estimating a grid cell value based on data of the four adjacent cells. It is used for "resampling" raster datasets to create new raster data with a different cell size or internal geometry. A bilinear interpolation consists of two linear interpolations on opposite sides followed by another linear interpolation of these intermediate results.

Figures 2, 3A, 3B:
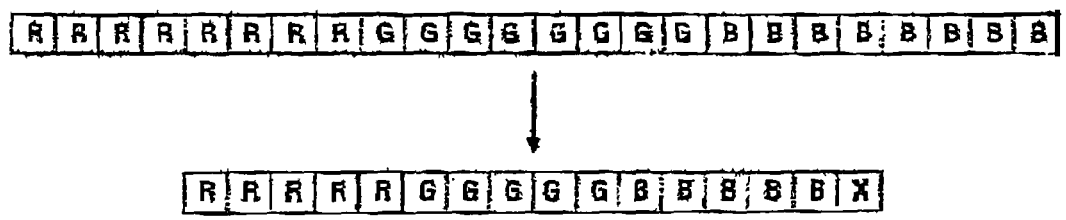
FIG. 2 shows the plot of an image point and its surrounding points.
Figure 4A:
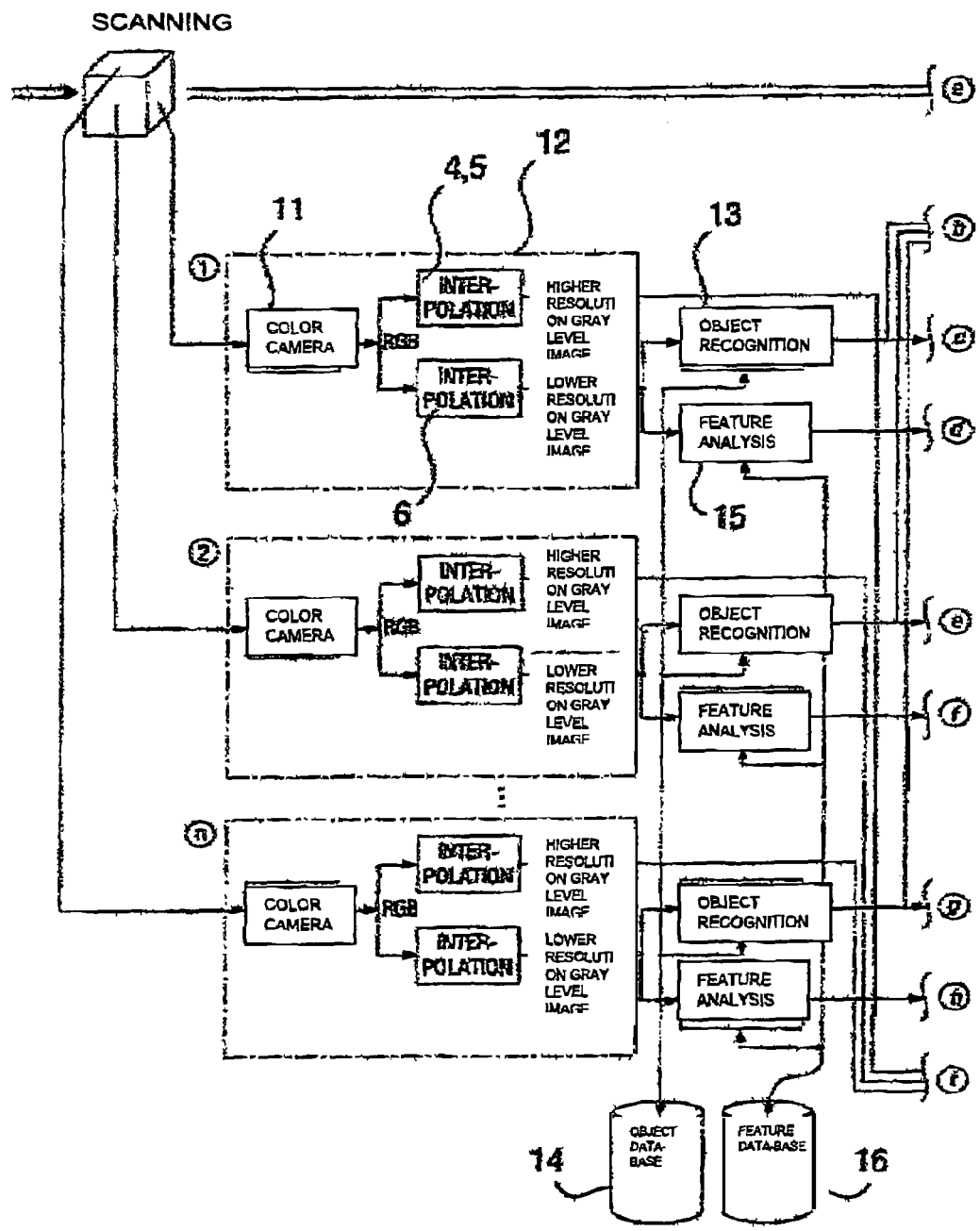
FIG. 4 shows a block diagram of the overall arrangement.
Figure 4B:
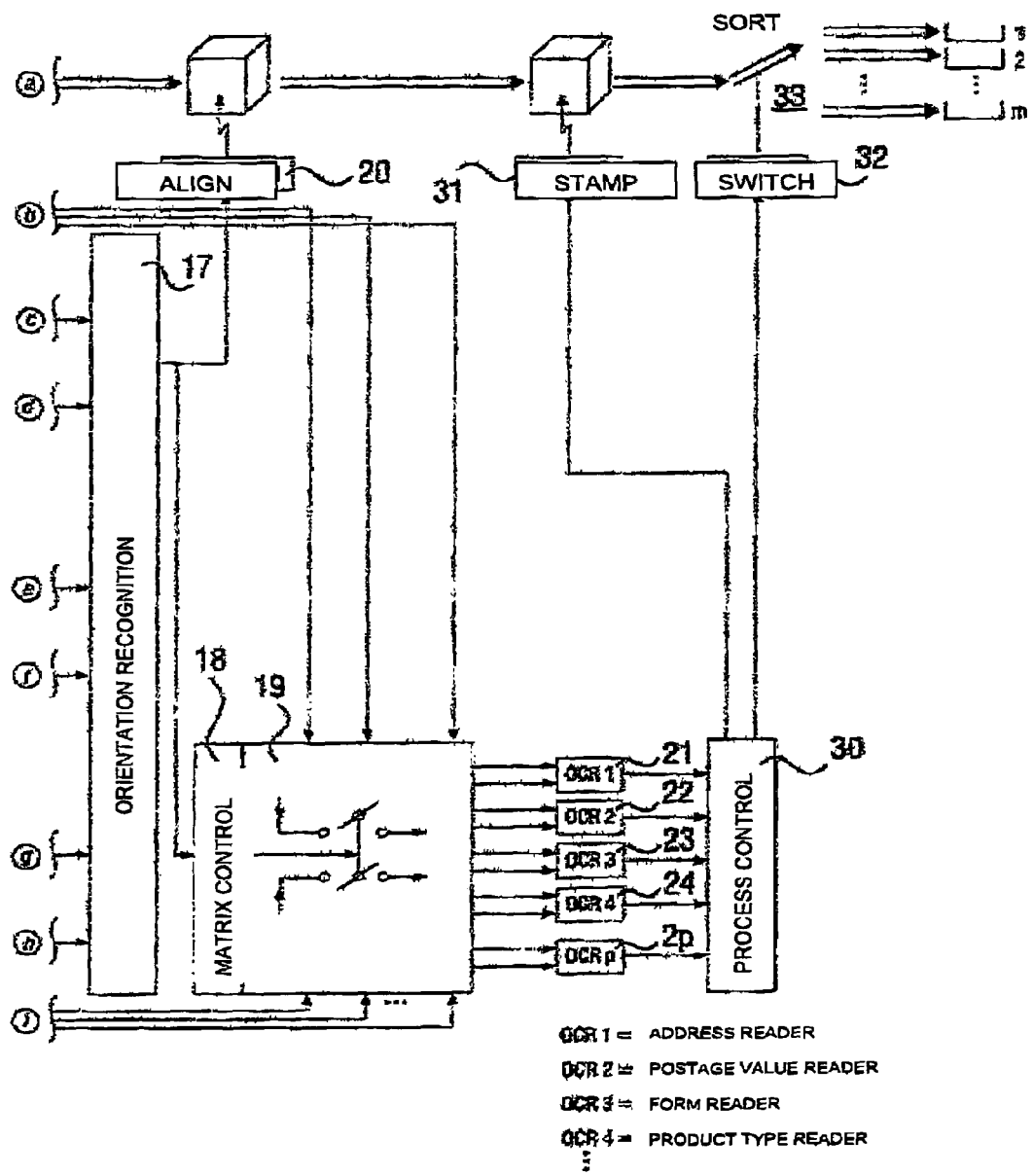

In this application, the resolution of the original color image is increased from 150 dpi to 200 dpi. FIG. 2 contains an extract from a raster plot. The new pixel N(x,y) is calculated by linear interpolation from the values of the adjacent pixels N(x,y−1), N(x,y+1), N(x−1,y) and N(x+1,y). The coefficients used for this purpose are determined for optimum image quality.

The sequence, i.e. whether interpolation takes place in the gray level image or in the color image, can also be selected differently depending on the software modules available. To determined and identify the objects present in the color image, including their position, a lower resolution of the color image, in this case 100 dpi, is required. For this resampling, a bilinear interpolation is likewise used in a functional block 6.

The data of the associated 100 dpi color images and of the 200 dpi gray level images are transmitted via a color interface 7 and a gray level interface 8 respectively to a frame grabber 9, 10 of evaluating computer units.

It is also possible for the color and gray level image signals to be combined and transmitted jointly to a frame grabber of an evaluating computer unit, two gray level image lines being transferred to each color image line, for example. For this purpose, data reduction for the pixels of the 100 dpi color image is first performed. As shown in FIG. 3a, this consists of cutting off the three lowest order bits in each color channel.

To each color line (n times 2 bytes) are appended two lines (also n times 2 bytes) of the gray level image for transmission to the frame grabber 10. The first pixels of the lines, as they are received from the frame grabber 10, are as shown in FIG. 3b.

This ensures that the lines are of equal length, as required by the Camera Link standard.

The image data of the two images arrive synchronously in the computer unit where they can be processed immediately.

For each side of a mail item, the low resolution color images are fed to an object recognition system 13 and a feature, analysis system 15 for identifying the objects. These two systems 13, 15 compare the individual regions on the surfaces with stored objects in an object database 14 and with stored feature sets in a feature database 16 respectively. All the found objects and features of all the surfaces are forwarded to a functional group 17 for orientation recognition. This functional group 17 for orientation recognition decides on the orientation of the item on the basis of the found objects or features. If e.g. stamps have been found, this indicates the front of a letter. The stamp signifies the top right hand corner. The orientation recognition function finally controls an alignment device 19 in order to rotate the item to the specified orientation.

The result of orientation recognition is not only made available to the alignment device 20 but also to the controller 18 of a distribution matrix 19 which then makes the results (the coordinates of the relevant regions) of object recognition and identification using the associated gray level images (whole images or extracted regions) available to specialized OCR units 21-2p.

OCR unit 1 21 receives e.g. the destination address block and the associated gray level image so that the address can be read, OCR unit 2 22 receives all the stamps and frankings as well as the associated gray level images so that the postage values of the stamps and frankings can be read, OCR unit 3 23 receives recognized forms and the associated gray level image so that the form can be read out, OCR unit 4 24 receives the recognized stickers so that a decision can be made about the item type (e.g. airmail letter, registered mail).

The results of the OCR units 21-2p are finally forwarded to a process controller 30 which can decide how the mail items are to be processed, e.g. postmarking of the stamps in a stamping device 31.

The process controller 30 also controls switches 32 of a sorting device which ensures that the mail items are directed to different containers. This takes place using a sorting plan which can be determined by the customer.

It will of course be clear to a person skilled in the art how an implementation can be modified according to the hardware conditions. Using computer units of appropriate capability it is e.g. possible to perform object recognition, feature analysis and inscription reading in one computer unit.

The invention claimed is:

1. A method for recognizing objects and their position as well as reading their postal information in color and gray level images of mail item surfaces using at least one automatic reading device, comprising the steps of:

capturing the mail item surface using at least one color camera, converting the color image produced in the camera into a gray level image having a resolution higher than that of the camera and suitable for reading the postal information in the automatic reading devices, converting the color image produced in the camera into a color image having a resolution lower than the camera resolution but sufficient for recognizing objects and their positions, determining and identifying the objects in the relevant lower resolution color image including their position, the assignment of the objects to postal information categories being performed on the basis of structural rules established in an upstream teaching phase, and reading the postal information in the gray level images of the relevant identified objects.

2. The method according to claim 1, wherein the automatic reading devices include a plurality of specialized OCR units assigned to defined objects, the OCR units arranged such that the postal information of the identified and defined objects in the associated gray level images are read by the OCR units.

3. The method according to claim 1, wherein the gray level images of the entire mail item surface are transmitted to the OCR units along with the object data and reading only takes place in the gray level images of the relevant objects.

4. The method according to claim 1, wherein the object data together with the gray level images of these objects only are transmitted to the OCR units.

5. The method according to claim 1, wherein the image data of the gray level image and low resolution color image of a mail item surface is transmitted synchronously to the reading device.

6. The method according to claim 1, wherein for the position of the objects, their orientation is also determined and the position and orientation data of a plurality of mail item sides is used to control an alignment device which brings the mail items into a uniform position.

7. An arrangement for recognizing objects and their position as well as reading their postal information in color and gray level images of mail item surfaces using at least one automatic reading device, comprising:

means for capturing the mail item surface using at least one color camera, means for converting the color image produced in the camera into a gray level image having a resolution higher than that of the camera and suitable for reading the postal information in the automatic reading devices, means for converting the color image produced in the camera into a color image having a resolution lower than the camera resolution but sufficient for recognizing objects and their positions, means for determining and identifying the objects in the relevant lower resolution color image including their position, the assignment of the objects to postal information categories being performed on the basis of structural rules established in an upstream teaching phase, and means for reading the postal information in the gray level images of the relevant identified objects.

8. The arrangement according to claim 7, wherein the means for capturing, means for converting and means for determining are executed in the processor of the color scanner.

9. The arrangement according to claim 7, wherein the means for determining and identifying the objects and the means for reading of the postal information takes place in at least one computer unit to which the image data of the gray level image and low resolution color image is synchronously transmitted via frame grabbers.

10. The arrangement according to claim 7, further comprising a plurality of OCR units assigned to defined objects and arranged to receive images of the assigned objects from at least one object identification arrangement which is connected to the color scanner.

11. The arrangement according to claim 7, wherein the color camera comprises an RGB CCD line sensor past which the mail items are transported.

\* \* \* \* \*